(12) United States Patent
Stares

(10) Patent No.: US 9,358,884 B2
(45) Date of Patent: Jun. 7, 2016

(54) VEHICLE AND METHOD OF CONTROLLING A VEHICLE

(75) Inventor: Pete Stares, Whitley (GB)

(73) Assignee: Jaguar Land Rover Limited, Whitley, Coventry, Warwickshire (GB)

(*) Notice: Subject to any disclaimer, the term of this patent is extended or adjusted under 35 U.S.C. 154(b) by 197 days.

(21) Appl. No.: 14/000,391

(22) PCT Filed: Feb. 20, 2012

(86) PCT No.: PCT/EP2012/052850
§ 371 (c)(1),
(2), (4) Date: Oct. 25, 2013

(87) PCT Pub. No.: WO2012/110658
PCT Pub. Date: Aug. 23, 2012

(65) Prior Publication Data
US 2014/0067217 A1    Mar. 6, 2014

(30) Foreign Application Priority Data

Feb. 18, 2011    (GB) .................................. 1102823.0

(51) Int. Cl.
*B60K 23/08*        (2006.01)
*B60K 17/34*        (2006.01)
*B60K 17/35*        (2006.01)
(Continued)

(52) U.S. Cl.
CPC .................. *B60K 23/08* (2013.01); *B60K 17/34* (2013.01); *B60K 23/0808* (2013.01); *B60K 17/3515* (2013.01); *B60K 2023/0858* (2013.01); *B60W 10/02* (2013.01); *B60W 2050/0028* (2013.01); *B60W 2510/0291* (2013.01)

(58) Field of Classification Search
CPC combination set(s) only.
See application file for complete search history.

(56) References Cited

U.S. PATENT DOCUMENTS

| 5,014,809 A | 5/1991 | Matsuda |
| 5,152,362 A | 10/1992 | Naito |
| 8,204,657 B2 | 6/2012 | Buszek et al. |

(Continued)

FOREIGN PATENT DOCUMENTS

| CN | 101863225 A | 10/2010 |
| GB | 2407804 A | 5/2005 |
| JP | 10272955 A | 10/1998 |
| JP | 2004322702 A | 11/2004 |
| JP | 2009166706 A | 7/2009 |

OTHER PUBLICATIONS

International Search Report for PCT/EP2012/052850 dated May 31, 2012, 3 pages.

(Continued)

*Primary Examiner* — John R Olszewski
*Assistant Examiner* — James M McPherson
(74) *Attorney, Agent, or Firm* — Reising Ethington P.C.

(57) ABSTRACT

A vehicle having: a prime mover; first and second groups of wheels; and a driveline operable by a controller to connect the first group of wheels to a torque transmission path when the driveline is in a first mode, and the first and second groups of wheels thereto when in a second mode. The driveline is operable to connect the second group of wheels to the torque transmission path via an auxiliary portion comprising first and second releasable torque transmitting means and a prop shaft, the first and second torque transmitting means are respectively operable to connect the prop shaft to the torque transmission path and the second group of wheels. The controller is operable to control the driveline to transition from the first mode to the second mode at a connect rate that is responsive to the identity of a trigger condition that is met.

34 Claims, 3 Drawing Sheets

(51) Int. Cl.
*B60W 50/00* (2006.01)
*B60W 10/02* (2006.01)

(56) References Cited

U.S. PATENT DOCUMENTS

2002/0035002 A1* 3/2002 Ishikawa et al. .............. 475/203
2008/0103009 A1* 5/2008 Park .............................. 475/231
2009/0008206 A1* 1/2009 Bowen ......................... 192/48.2
2010/0262326 A1* 10/2010 Buszek et al. .................. 701/29
2010/0274456 A1* 10/2010 Kondo et al. .................... 701/69
2011/0082004 A1* 4/2011 Kato et al. ...................... 475/303

OTHER PUBLICATIONS

Combined Examination and Search Report corresponding to application No. GB1102823.0, dated May 18, 2011, 3 pages.
Japanese Office action corresponding to application No. JP2013-553959, dated Aug. 5, 2014, 6 pages.
Chinese Office action corresponding to application No. 201280018971.8, dated Aug. 19, 2015, 20 pages.

* cited by examiner

VEHICLE AND METHOD OF CONTROLLING A VEHICLE

FIELD OF THE INVENTION

The present invention relates to a motor vehicle and to a method of controlling a motor vehicle. In particular but not exclusively the invention relates to motor vehicles such as all-terrain vehicles (ATVs) having a driveline that is operable change the number of wheels that provide torque to drive the vehicle.

BACKGROUND

It is known to provide a motor vehicle having a four wheel drive mode of operation in which motive power is supplied to each of two pairs of wheels of the vehicle. Motive power is supplied to the wheels by means of a driveline.

Some known vehicles are arranged such that motive power is permanently supplied to both pairs of wheels. Some other vehicles are arranged such that motive power is selectively supplied to either only one pair or to both pairs of wheels. A driver operable selector may be provided to allow the driver to select two wheel or four wheel operation. Some driveline systems require the vehicle to be stationary when transitioning between two and four wheel drive modes. Such systems may be referred to as static disconnect/reconnect systems.

GB2407804 discloses a dynamic driveline reconnect arrangement in which reconnection of two of the wheels to the driveline following disconnection of the wheels from the driveline may be undertaken when the vehicle is moving. Such a system may be referred to as a dynamic driveline reconnect system. The system disclosed in GB2407804 employs clutch arrangements to enable dynamic driveline reconnection.

In some known dynamic driveline reconnect systems the vehicle is operable automatically to disconnect the driveline to two of the wheels when a prescribed condition is met so that the vehicle operates in a two wheel drive mode. The system automatically reconnects the driveline to enable four wheel drive operation when the prescribed condition is not met.

It is an aim of embodiments of the present invention to at least partially mitigate the disadvantages of known dynamic driveline systems.

STATEMENT OF THE INVENTION

Embodiments of the invention may be understood by reference to the appended claims.

Aspects of the invention provide a motor vehicle and a method.

In a further aspect of the invention for which protection is sought there is provided a motor vehicle having:
   prime mover means;
   at least first and second groups of one or more wheels; and
   a driveline operable by means of control means to connect a torque transmission path from the prime mover means to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
   the driveline being operable to connect the second group to the torque transmission path from the prime mover means by means of an auxiliary portion thereof, the auxiliary portion comprising first and second releasable torque transmitting means and a prop shaft, the first releasable torque transmitting means being operable to connect a first end of the prop shaft to the torque transmission path from the prime mover means, the second releasable torque transmitting means being operable to connect a second end of the prop shaft to the second group of one or more wheels,
   the control means being operable to control auxiliary portion to switch the driveline between the first and second modes of operation such that in the first mode the prop shaft is disconnected from both the torque transmission path from the prime mover means and said second group of one or more wheels,
   the control means being operable to control the auxiliary portion to connect the second group of one or more wheels to the torque transmission path from the prime mover means at a required connect rate when the driveline transitions between the first mode and the second mode,
   wherein when the driveline is in the first mode the control means is operable to control the driveline to transition to the second mode when one of a set of two or more trigger conditions in respect of one or more vehicle operating parameters is met, each trigger condition having a respective identity, the control means being operable to control the driveline to transition from the first mode to the second mode at a connect rate that is responsive to the identity of the trigger condition that is met.

It is to be understood that the rate of connection of the second group of one or more wheels to the torque transmission path from the prime mover means by the auxiliary portion of the driveline may be considered to relate to a time period within which a connect operation is performed. The higher the rate of connection, the smaller the time period over which the driveline completes an operation in which driveline transitions from the first mode to the second mode. Thus reference to a connect rate may be alternatively considered to be reference to a time period within which a connect operation is completed, i.e. a time period within which a transition from the first mode to the second mode may be completed. By completed is meant that the first and second releasable torque transmitting means have completed an operation in which a prop shaft is connected to the torque transmission path from the prime mover means and the second group of one or more wheels. In the case where the releasable torque transmission means comprise clutch means, completion is understood to mean that the clutch means is fully (and not partially) closed.

Thus, the control means may be operable to control the driveline to transition from the first mode to the second mode over a time period the length of which is responsive to the identity of the trigger condition that is met.

In some embodiments where the releasable torque transmitting means comprises a clutch or clutch means, reference to a connect rate may be understood as reference to a rate of closure of the clutch or clutch means. In some embodiments reference to a connect rate may be understood as reference to a total time taken for a plurality of clutch means to fully close; for example a time delay between closure of one clutch means and closure of another clutch means may be changed, resulting in a different connect rate. In some arrangements it may be advantageous to close clutch means of one of the first and second releasable torque transmitting means before closing the clutch means of the other of the first and second releasable torque transmitting means in order to spin up the prop shaft before the other clutch means is closed. This can reduce noise, vibration and/or harshness (NVH) associated with driveline connect operations. However where a connect operation is urgent, the clutch means of the first and second releasable torque transmitting means may be closed substantially simultaneously or one immediately after the other with little or no delay between the respective closure operations.

It is to be understood that when the prop shaft is disconnected from both the torque transmission path from the prime mover means and said second group of one or more wheels the prop shaft may be substantially stationary even when the vehicle is moving. This has the advantage that energy losses associated with prop shaft rotation may be reduced or eliminated in some embodiments.

It is to be understood that reference herein to a group of one or more wheels includes reference to a group having a membership of only one wheel.

Embodiments of the invention have the advantage that the vehicle is able to control the driveline in such a manner as to provide optimum performance characteristics in a given situation. Thus, for example in circumstances where a transition to the second mode may be more urgent, such as when the vehicle is skidding, the connect rate may be made faster (i.e. the connect operation completed sooner) than in circumstances where the transition is less urgent.

In an embodiment the set of trigger conditions includes at least one condition selected from amongst the conditions that:
(a) an instantaneous amount of torque being delivered through the driveline to one or more wheels is above a first prescribed instantaneous torque threshold,
(b) a steering wheel angle is above a first prescribed steering angle threshold,
(c) a steerable road wheel angle is greater than a first prescribed steerable road wheel angle threshold,
(d) a rate of change of steerable road wheel angle exceeds a first steerable road wheel angle rate threshold,
(e) a rate of change of steering wheel angle exceeds a first prescribed steering wheel angle rate threshold,
(f) a lateral acceleration of the vehicle is greater than a first prescribed lateral acceleration threshold,
(g) a rate of change of lateral acceleration exceeds a first prescribed lateral acceleration rate threshold,
(h) a throttle or accelerator pedal position value is greater than a first prescribed throttle or accelerator pedal position threshold,
(i) a rate of change of throttle or accelerator pedal position is greater than a first prescribed throttle or accelerator rate threshold,
(j) a driver demanded torque is greater than a first prescribed driver demanded torque threshold,
(k) a prime mover means torque is greater than a first prescribed prime mover means torque threshold,
(l) an amount of wheel slip is above a first prescribed wheel slip threshold,
(m) a vehicle acceleration is greater than a first prescribed vehicle acceleration threshold,
(n) a vehicle deceleration is greater than a first prescribed vehicle deceleration threshold,
(o) a yaw rate of the vehicle is greater than a first prescribed yaw rate threshold,
(p) a yaw rate error is greater than a first prescribed yaw rate error threshold,
(q) a manual or automatic gear shift control is set to one of a first set of one of one or more prescribed gear shift position values,
(r) an operating temperature is below a first prescribed operating temperature threshold,
(s) an ambient temperature is below first a prescribed ambient temperature threshold,
(t) a temperature of a vehicle component is below a first component temperature threshold,
(u) a temperature of a vehicle fluid is below a first fluid temperature threshold,
(v) a temperature of a component of the auxiliary driveline is below a first prescribed driveline component lower temperature threshold,
(w) a temperature of a fluid of the auxiliary driveline is below a first prescribed driveline fluid lower temperature threshold,
(x) a temperature of a component of the auxiliary driveline is above a first prescribed driveline component upper temperature threshold greater than the first prescribed driveline component lower temperature threshold,
(y) a temperature of a fluid of the auxiliary driveline is above a first prescribed driveline fluid upper temperature threshold greater than the first prescribed driveline fluid lower temperature threshold,
(z) a speed of the vehicle is below a first prescribed vehicle speed threshold,
(a1) the vehicle has begun to operate according to one or more of a prescribed set of one or more vehicle operating programs,
(b1) a roughness of a driving surface exceeds a first prescribed surface roughness threshold,
(c1) a current or target gear of an automatic transmission is set to one of a first set of one of one or more gear values,
(d1) a brake pedal position value is greater than a first prescribed brake pedal position threshold, and
(e1) a brake pressure value is greater than a first prescribed brake pressure threshold, Thus if the vehicle is operating according to a vehicle program in which the second mode of operation of the driveline is not permanently required and the driver selects a vehicle operating mode in which the second mode of operation of the driveline is permanently required (such as an off-road mode) the driveline is configured automatically to assume the second mode of operation.

In an embodiment the vehicle has a plurality of driver-selectable vehicle programs of operation wherein the set of two or more trigger conditions includes the requirement that the vehicle is operating according to a prescribed vehicle program.

In an embodiment the connect rate is responsive to the speed of the vehicle and the connect rate is arranged to increase as a function of increasing vehicle speed.

That is, the time required to complete the transition from the first mode to the second mode decreases as a function of increasing vehicle speed.

This feature has the advantage that if the vehicle (or driver) selects the second mode the vehicle will assume the second mode more quickly at higher vehicle speeds. This has the advantage that if the second mode is assumed when travelling at a relatively high speed, for example in the event of a skid, the second mode is assumed more quickly than in the event the vehicle is travelling more slowly.

Furthermore, this feature has the advantage that the benefit of a higher connection operation rate may be enjoyed without a noticeable decrease in NVH (noise, vibration and harshness) performance. This is because a higher rate of connection is only employed at higher vehicle speeds where NVH due to connection of the second pair of wheels may be masked by ambient vehicle noise and vibrations due to the speed of movement of the vehicle.

The prime mover means is arranged to rotate in use, the connect rate being responsive to a speed of rotation of the prime mover means, the connect rate being arranged to increase as a function of increasing prime mover means rotation speed.

This has the advantage that at lower prime mover means speeds (such as engine speeds) where the prime mover means is likely to take longer to respond to driver torque requests or throttle inputs (and therefore a reduced connection rate will be less noticeable to a driver) a reduced connection rate is employed thereby reducing an amount of component wear occurring when a connection is made. Reduced noise and vibration is also enjoyed by a driver without a significant decrease in performance of the vehicle since as noted above prime mover means response time is increased at lower prime mover means speeds.

Increased prime mover means response time may occur for example due to turbo lag on turbocharged engines.

At higher prime mover means speeds however where prime mover means noise levels are increased a higher connection rate may be employed without a noticeable decrease in NVH performance of the vehicle.

In an embodiment the connect rate is responsive to an amount of lateral acceleration of the vehicle.

In an embodiment the connect rate is arranged to increase as a function of increasing lateral acceleration of the vehicle.

This feature has the advantage that if lateral acceleration is detected above a threshold value (for example a value indicating that the vehicle may be skidding) the vehicle is arranged to connect the second set of wheels to the prime mover means at a higher rate than that when the amount of lateral acceleration is below the threshold value, in order to prevent skidding or further skidding.

This feature has the advantage that the connection rate is responsive to a severity of a situation in which a driver finds himself. Thus in the case that severe lateral acceleration is detected the vehicle is arranged more rapidly to connect the second pair of wheels to the prime mover means compared with a situation in which relatively mild lateral acceleration is detected.

In an embodiment when the amount of lateral acceleration exceeds a threshold value the control means is arranged to control the driveline to connect the second pair of wheels to the prime mover means at a connect rate that is greater than that when the amount of lateral acceleration does not exceed the threshold value.

In an embodiment the connect rate is responsive to a volume of a vehicle audio system.

In an embodiment the connect rate is arranged to increase as a function of increasing volume of the audio system.

It is to be understood that a greater amount of NVH associated with a transition to the second mode may be masked by the vehicle audio system as the volume of the audio system is increased. This allows a more rapid transition to the second mode as the volume increases without a noticeable increase in NVH as perceived by a vehicle occupant.

Optionally the volume is the user-selected volume.

Alternatively the volume is the actual volume of sound emanating from the audio system at the moment a connect event is required.

In an embodiment the set of two or more trigger conditions comprises at least a first subset of one or more conditions and a second subset of one or more conditions, the driveline being arranged to assume the second mode at a connect rate that is greater when a condition of the first subset is met than that when a condition of the second subset is met and no condition of the first subset is met.

This feature has the advantage that the connection operation rate may be responsive to a type and/or severity of the event triggering the transition to the second mode and therefore adapt to the situation experienced by a vehicle.

In an embodiment the first subset of conditions comprises at least one selected from amongst the conditions that:
(a) an instantaneous amount of torque being delivered through the driveline to one or more wheels is above a first prescribed instantaneous torque threshold,
(b) a steering wheel angle is above a first prescribed steering angle threshold,
(c) a steerable road wheel angle is greater than a first prescribed steerable road wheel angle threshold,
(d) a rate of change of steerable road wheel angle exceeds a first steerable road wheel angle rate threshold,
(e) a rate of change of steering wheel angle exceeds a first prescribed steering wheel angle rate threshold,
(f) a lateral acceleration of the vehicle is greater than a first prescribed lateral acceleration threshold,
(g) a rate of change of lateral acceleration exceeds a first prescribed lateral acceleration rate threshold,
(h) a throttle or accelerator pedal position value is greater than a first prescribed throttle or accelerator pedal position threshold,
(i) a rate of change of throttle or accelerator pedal position is greater than a first prescribed throttle or accelerator rate threshold,
(j) a driver demanded torque is greater than a first prescribed driver demanded torque threshold,
(k) a prime mover means torque is greater than a first prescribed prime mover means torque threshold,
(l) an amount of wheel slip is above a first prescribed wheel slip threshold,
(m) a vehicle acceleration is greater than a first prescribed vehicle acceleration threshold,
(n) a vehicle deceleration is greater than a first prescribed vehicle deceleration threshold,
(o) a yaw rate of the vehicle is greater than a first prescribed yaw rate threshold,
(p) a yaw rate error is greater than a first prescribed yaw rate error threshold,
(q) a brake pedal position value is greater than a first prescribed brake pedal position threshold, and
(r) a brake pedal pressure value is greater than a first prescribed brake pedal position threshold, In an embodiment the second subset of conditions comprises at least one condition selected from amongst the conditions that:
(a) a manual or automatic gear shift control is set to one of a first set of one of one or more prescribed gear shift position values,
(b) an operating temperature is below a first prescribed operating temperature threshold,
(c) an ambient temperature is below first a prescribed ambient temperature threshold,
(d) a temperature of a vehicle component is below a first component temperature threshold,
(e) a temperature of a vehicle fluid is below a first fluid temperature threshold,
(f) a temperature of a component of the auxiliary driveline is below a first prescribed driveline component lower temperature threshold,
(g) a temperature of a fluid of the auxiliary driveline is below a first prescribed driveline fluid lower temperature threshold,
(h) a temperature of a component of the auxiliary driveline is above a first prescribed driveline component upper temperature threshold greater than the first prescribed driveline component lower temperature threshold, (i) a temperature of a fluid of the auxiliary driveline is above a first prescribed driveline fluid upper temperature threshold greater than the first prescribed driveline fluid lower temperature threshold,
(j) a speed of the vehicle is below a first prescribed vehicle speed threshold,
(k) the vehicle has begun to operate according to one or more of a prescribed set of one or more vehicle operating programs,
(l) a roughness of a driving surface exceeds a first prescribed surface roughness threshold and
(m) a current or target gear of an automatic transmission is set to one of a first set of one of one or more gear values.

The condition (condition (k)) that the vehicle has begun to operate according to one or more of a prescribed set of one or more vehicle operating programs may be met for example if the driver selects a prescribed operating program or if a prescribed operating program is assumed automatically by the vehicle.

In an embodiment the driveline is configured to assume the second mode responsive to the output of a reactive evaluator and a predictive evaluator,
the output of the reactive evaluator being responsive to a determination whether an amount of wheel slip has exceeded a first prescribed threshold,
the output of the predictive evaluator being responsive to a determination that one or more conditions in respect of one or more vehicle operating parameters are met indicating that the amount of wheel slip may be about to exceed a second prescribed threshold when the amount of wheel slip is below the first prescribed threshold.

In an embodiment the second subset of conditions comprises the condition that the output of the predictive evaluator indicates that the second mode of operation should be assumed.

In an embodiment the first subset of conditions includes the condition that the output of the reactive evaluator indicates that the second mode of operation should be assumed.

Thus the driveline may be arranged to assume the second mode of operation at a lower rate if a predictive evaluator predicts that the second mode of operation should be assumed. This has the advantage that an amount of wear of components of the driveline and an amount of NVH generated when the vehicle assumes the second mode is reduced compared with a situation in which the vehicle does not predict an event that requires the driveline to assume the second mode at a higher rate and such an event subsequently occurs. If such an event does subsequently occur, resulting in the vehicle assuming the second mode at the higher rate, the amount of wear of components of the vehicle is increased and the NVH performance of the vehicle is decreased. These events are to be avoided if possible during the course of vehicle operation.

In an embodiment the predictive evaluator is arranged to determine a likelihood of one of the first set of conditions occurring within a prescribed period of time based on the value of one or more vehicle operating parameters.

In some embodiments, the reactive evaluator is arranged only to output a signal requesting a transition to the second mode at a higher rate, whilst the predictive evaluator is arranged to output a signal requesting a transition to the second mode at either a high rate or a low rate.

In some embodiments the prime mover means comprises an engine and the predictive evaluator is arranged to output a signal requesting a relatively fast transition if the predictive evaluator determines that the transition to the second mode should be made and prescribed conditions are met in respect of at least one of the accelerator pedal position, an engine speed and a currently selected gear.

If the prescribed conditions are not met, the predictive evaluator is arranged to output a signal requesting a relatively slow transition if the predictive evaluator determines that the transition to the second mode should be made.

In some arrangements, if the accelerator pedal position exceeds a prescribed position when the vehicle is in a prescribed gear and the engine speed is above a prescribed speed the predictive evaluator is arranged to request a transition at a relative high rate. For example, if the engine speed exceeds 3000 revolutions per minute (rpm) or any other suitable number.

The critical throttle position may vary with selected gear. For example the critical position may be 70% depression when in first gear, 80% depression when in second gear and 95% depression when in third gear. Other depression values are also useful.

Optionally the connect rate is responsive to a history of previous connect rates, the control means being arranged to store data associated with previous connect events responsive to which the control means is operable to determine a required connect rate when a transition from the first mode to the second mode is required.

In an embodiment the data corresponds to at least one selected from amongst the rate of connection assumed during one or more previous connect events, the identity of the trigger condition triggering one or more previous connect events and a value of one or more vehicle operating parameters when one or more previous connect events occurred.

This has the advantage that the vehicle may be configured to be adaptive to a drive style of a user or to conditions of an environment in which a vehicle is deployed. Thus if a vehicle is deployed in an environment in which slippery road conditions exist and the vehicle assumes frequently the four wheel drive mode due to skidding the vehicle may be arranged to increase the rate at which the transition to the second mode occurs for one or more conditions that can trigger the transition to the second mode, for example conditions that would normally occur trigger driveline connection at a relatively slow rate. Other arrangements are also useful.

In an embodiment the control means is configured to control the driveline to assume the second mode at a rate responsive to a coefficient of friction of a surface on which the vehicle is driving.

Optionally the driveline is configured to assume the second mode at a rate responsive to a predicted coefficient of friction of a surface on which the vehicle is driving.

Optionally the driveline is configured to assume the first mode from the second mode at a substantially constant rate irrespective of the identity of the trigger condition triggering the transition to the second mode.

In an embodiment the control means is configured to control the driveline to transition from the second mode to the first mode at a rate that is less than the rate at which a transition from the first mode to the second mode is made when a condition of the first subset is met.

This has the advantage that NVH performance may be increased and an amount of component wear may be reduced when the transition to the first mode is made.

In an embodiment when in the first mode the driveline is operable to transition to the second mode when the value of one or more vehicle operating parameters is greater than or less than a prescribed value, the driveline being arranged to transition to the second mode at a rate responsive to the difference between the prescribed value and the value of the vehicle operating parameter when the transition to the second mode is made.

In an embodiment one or both of the first and second releasable torque transmitting means comprises one or more actuators arranged to perform the connection operation, the connection operation rate being dependent on a rate of movement of the one or more actuators.

In an embodiment one or both of the first and second releasable torque transmitting means comprises a plurality of actuators arranged to perform the connection operation.

In an embodiment at least two of the actuators of said one or both of the first and second releasable torque transmitting means are arranged to be actuated at different respective moments in time, the connection operation rate being dependent on an amount of time elapsing between actuation of the respective actuators.

Optionally the first releasable torque transmitting means comprises at least a first actuator and the second releasable torque transmitting means comprises at least a first actuator, the connection rate being dependent on an amount of time elapsing between actuation of respective actuators of the first and second releasable torque transmitting means.

In an embodiment the prime mover means comprises at least one selected from amongst an engine and an electric machine.

The prime mover means may comprise an engine and an electric machine.

The engine may be an internal combustion engine.

In a further aspect of the invention for which protection is sought there is provided a method of controlling a motor vehicle, the motor vehicle having:
  prime mover means;
  at least first and second groups of one or more wheels; and
  a driveline operable by means of control means to connect
    a torque transmission path from the prime mover means
    to the first and second groups of one or more wheels such
    that the first group of one or more wheels and not the
    second group is coupled to the torque transmission path
    when the driveline is in a first mode of operation and
    both the first and second groups of one or more wheels
    are coupled to the torque transmission path when the
    driveline is in a second mode of operation,
  the driveline being operable to connect the second group to
    the torque transmission path from the prime mover
    means by means of an auxiliary portion thereof, the
    auxiliary portion comprising first and second releasable
    torque transmitting means and a prop shaft, the first
    releasable torque transmitting means being operable to
    connect a first end of the prop shaft to the torque transmission path from the prime mover means, the second
    releasable torque transmitting means being operable to
    connect a second end of the prop shaft to the second
    group of one or more wheels,
  the method comprising controlling the auxiliary portion to
    switch the driveline between the first and second modes
    of operation whereby in the first mode the prop shaft is
    disconnected from both the torque transmission path
    from the prime mover means and said second group of
    one or more wheels,
  the method comprising controlling the driveline to transition to the second mode when one of a set of two or more
    trigger conditions in respect of one or more vehicle
    operating parameters is met, each trigger condition having a respective identity, the method comprising controlling the driveline to transition from the first mode to the
    second mode at a connect rate that is responsive to the
    identity of the trigger condition that is met.

In an aspect of the invention for which protection is sought there is provided a motor vehicle having:
  a prime mover;
  at least first and second groups of one or more wheels; and
  a driveline operable by means of control means to connect
    a torque transmission path from the prime mover means
    to the first and second groups of one or more wheels such
    that the first group of one or more wheels and not the
    second group is coupled to the torque transmission path
    when the driveline is in a first mode of operation and
    both the first and second groups of one or more wheels
    are coupled to the torque transmission path when the
    driveline is in a second mode of operation,
  the driveline being operable to connect the second group to
    the torque transmission path from the prime mover
    means by means of an auxiliary portion thereof, the
    auxiliary portion comprising first and second clutch
    means and a prop shaft, the first clutch means being
    operable to connect a first end of the prop shaft to the
    torque transmission path from the prime mover means,
    the second clutch means being operable to connect a
    second end of the prop shaft to the second group of one
    or more wheels,
  the control means being operable to control the auxiliary
    portion to switch the driveline between the first and
    second modes of operation such that in the first mode the
    prop shaft is disconnected from both the torque transmission path from the prime mover means and said
    second group of one or more wheels,
  the control means being operable to control the auxiliary
    portion to connect the second group of one or more
    wheels to the torque transmission path from the prime
    mover means at a required connect rate when the driveline transitions between the first mode and the second
    mode,
  wherein when the driveline is in the first mode the control
    means is operable to control the driveline to transition to
    the second mode when one of a set of two or more trigger
    conditions in respect of one or more vehicle operating
    parameters is met, each trigger condition having a
    respective identity, the control means being operable to
    control the driveline to transition from the first mode to
    the second mode at a connect rate that is responsive to
    the identity of the trigger condition that is met.

In an aspect of the invention for which protection is sought there is provided a motor vehicle having: a prime mover; at least first and second groups of one or more wheels; and a driveline to connect the prime mover to the first and second groups of one or more wheels such that the first group of one or more wheels is driven by the prime mover when the driveline is in a first mode of operation and the second group of one or more wheels is additionally driven by the prime mover when the driveline is in a second mode of operation, the driveline including an auxiliary driveline comprising releasable torque transmitting means operable to connect the second group of one or more wheels to the prime mover at a prescribed rate when the driveline transitions between the first mode and the second mode, wherein when in the first mode the driveline is operable to transition to the second mode when one of a first set of two or more conditions in respect of one or more vehicle operating parameters is met, the rate of connection being responsive to the identity of the condition that is met.

In an aspect of the invention for which protection is sought there is provided a method of controlling a motor vehicle, the motor vehicle having: a prime mover; at least first and second groups of wheels; and a driveline to connect the prime mover to the first and second groups of wheels such that the first group of wheels is driven by the prime mover when the driveline is in a first mode of operation and the second group of wheels is additionally driven by the prime mover when the driveline is in a second mode of operation, the driveline including an auxiliary driveline comprising releasable torque transmitting means operable to connect and disconnect the second group of wheels from the prime mover when the driveline transitions between the first mode and the second mode, the method comprising in the first mode controlling the driveline to transition to the second mode when one of a first set of two or more conditions in respect of one or more vehicle operating parameters is met, the method further comprising controlling the rate of connection responsive to the identity of the condition that is met.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
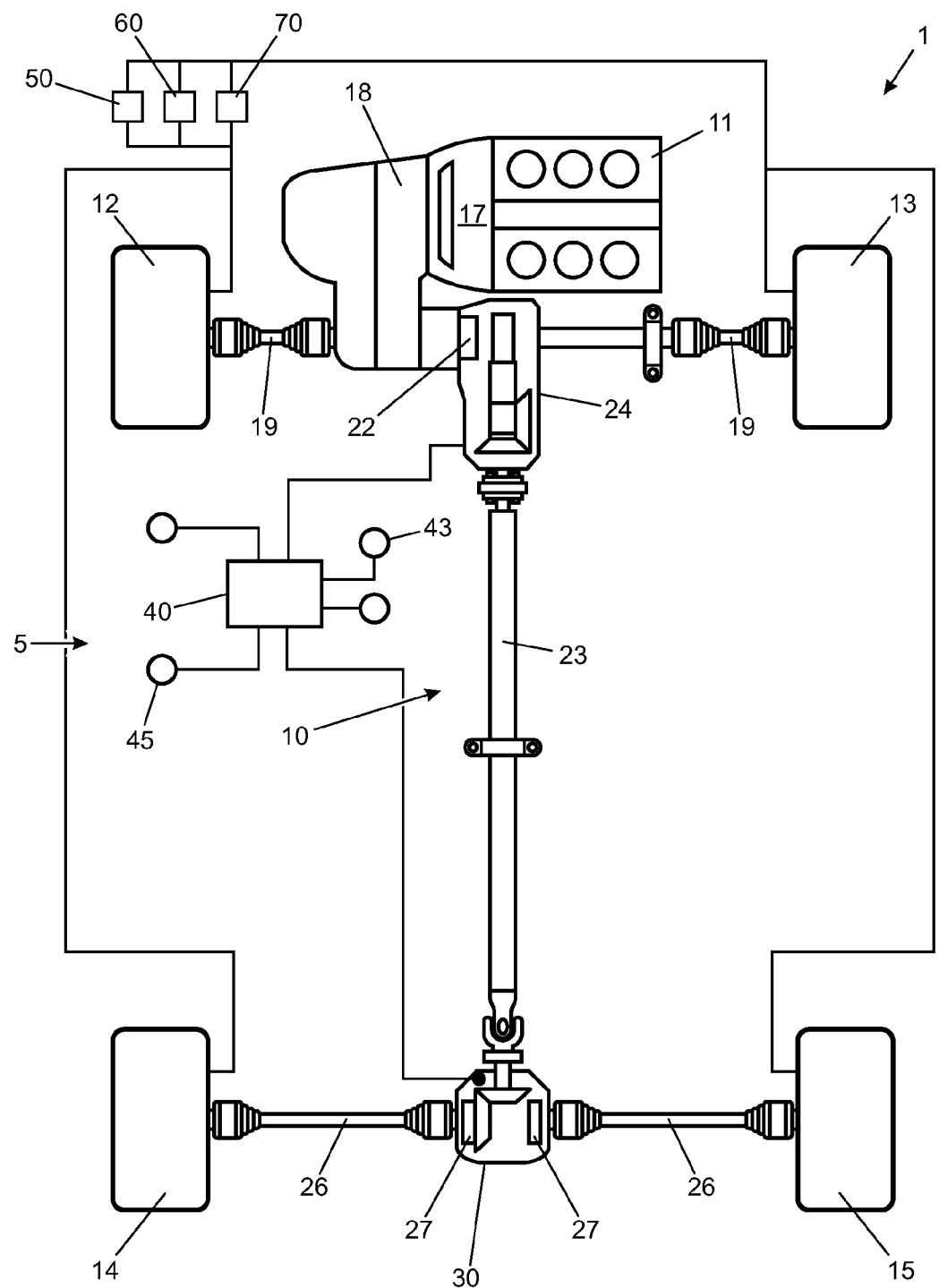
FIG. 1 is a schematic illustration of a vehicle according to an embodiment of the present invention.

A driveline 5 of a motor vehicle 1 according to an embodiment of the present invention is illustrated schematically in FIG. 1. The driveline 5 is connected to a prime mover in the form of an internal combustion engine 11 by means of a gear box 18, and has a pair of front wheels 12, 13, an auxiliary portion 10 and a pair of rear wheels 14, 15.

The driveline 5 is arranged selectively to transmit power supplied to it by the gearbox 18 from the internal combustion engine 11 to the front wheels 12, 13 only (in a two wheel drive mode of operation) or to the front wheels 12, 13 and the rear wheels 14, 15 simultaneously (in a four wheel drive mode of operation).

Power is transmitted from the internal combustion engine 11 to the front wheels 12, 13 by means of a clutch 17, a gearbox 18 and a pair of front drive shafts 19.

Power is transmitted to the rear wheels 14, 15 by means of the auxiliary portion of the driveline 10. The auxiliary portion 10 has a power transfer unit (PTU) 24 having a power transfer clutch (PTC) 22 operable to connect a main drive shaft or prop shaft 23 of the auxiliary portion 10 to the gearbox 18. The prop shaft 23 is coupled in turn to a rear differential 30 operable to couple the prop shaft 23 to the rear drive shafts 26.

The rear differential 30 has a pair of clutches 27 by means of which the rear differential 30 is operable to connect the prop shaft 23 to the rear drive shafts 26 when the four wheel drive mode of operation is required.

The driveline 5 has a controller 40 arranged to control operation of the PTU 24 and clutches 27. When a four wheel drive mode of operation is required the controller 40 is arranged to close the PTC 22 and to close clutches 27 of the differential 27.

In the embodiment of FIG. 1 the PTC 22 and differential clutches 27 have respective actuators operable to close the respective clutches at a selected one of a plurality of different rates. This allows the transition from the two wheel drive mode of operation to the four wheel drive mode of operation to be made at one of a corresponding plurality of different rates. It is to be understood that, in the case of a friction clutch, as the clutch is closed, a maximum amount of torque that the clutch is able to transmit from an input to an output thereof increases to a maximum transfer torque value associated with the closed condition. In the case of a multi-plate wet clutch the maximum amount of torque the clutch can transmit may be responsive to an amount of pressure applied to the plates of the clutch.

It is to be understood that the rate at which the respective actuators actuate the respective clutch arrangements may affect a rate of wear of the clutches and potentially one or more other components of the driveline 5. The rate of actuation may also impact the level of NVH (noise, vibration and harshness) experienced by a driver or passenger of a vehicle.

Recognising this, the present inventors have realised that in some circumstances it is desirable to actuate the clutches 27 of the differential 27 and/or the PTC 22 at a reduced rate in order to reduce a rate at which the rear wheels 14, 15 and/or gearbox are connected to the prop shaft 23. This can reduce a rate of wear of components of the driveline 5 and reduce NVH associated with a transition from the first mode to the second mode.

It is to be understood that in some embodiments not having a PTU 24 only the clutches 27 of the rear differential 30 would be operable to connect and disconnect the rear wheels 14, 15 from the engine 11.

Similarly, in some embodiments not having clutches 27 only the PTU 24 would be operable to connect and disconnect the rear wheels 14, 15 from the engine 11.

The controller 40 of the driveline 5 is arranged to control the auxiliary driveline 10 such that slower rates of actuation of the PTC 22 and clutches 27 are employed when a requirement to assume the four wheel drive mode of operation of the driveline 5 is less urgent and higher rates of actuation are employed when the requirement to assume the four wheel drive mode is more urgent.

It is to be understood that in the present embodiment the controller 40 is operable to control the driveline 5 to assume the four wheel drive mode responsive to a selection of a required vehicle operating mode or characteristic by a driver, or automatically, in response to a value of one or more vehicle operating parameters. Thus, in the event the controller 40 detects that an amount of wheel slip exceeds a prescribed value, the controller may control the driveline 5 automatically to assume four wheel drive mode. It is to be understood that a transition to four wheel drive driveline mode may be more urgent in some situations where the controller 40 determines automatically that the four wheel drive mode is required, compared with other situations where a requirement to assume four wheel drive mode is in response to (say) driver selection of a particular vehicle operating mode.

In the present embodiment the controller 40 is arranged to employ a relatively slow rate of connection of the auxiliary portion 10 of the driveline 5, promoting low NVH and reduced wear of the driveline 5, when the driver selects a vehicle mode of operation (such as a mode of operation of a gearbox or transmission 18) or a vehicle program (such as a terrain response program) that requires the driveline 5 to assume the four wheel drive mode.

For example, if the driver selects by means of a selector a four wheel drive mode the driveline 5 is arranged to assume the four wheel drive mode at a slower rate than if the vehicle were automatically to select four wheel drive mode due (for example) to detection of skidding.

Similarly if the driver selects a 'snow/ice' terrain response mode the vehicle is arranged automatically to assume the four wheel drive mode at a slower rate than that if the vehicle had detected an actual skidding event.

Similarly, if the vehicle exceeds a prescribed speed threshold above which four wheel drive operation is required in a given vehicle operating mode, or the speed falls below a speed threshold below which four wheel drive operation is required in a given vehicle operating mode, the driveline 5 is arranged to assume the four wheel drive mode of operation at a relatively slow rate of connection.

In some embodiments the rate of connection is also dependent on a speed of the vehicle 1 when a connection operation is required and a speed of the engine 11 when the connection operation is required. This is because NVH generated by the connection operation is likely to be less perceptible to a driver at higher vehicle or engine speeds (and therefore noise levels) than at lower vehicle or engine speeds, allowing a higher connection rate at higher vehicle or engine speeds without a noticeable (or at least not a substantial) fall in NVH performance.

Lower connection operation rates at lower engine speeds also have the advantage that a loss in performance of the vehicle due to the lower connection rate is less likely to be noticeable to the driver due to increased engine response time (i.e. slower engine response) at lower engine speeds. This may be due for example to turbo lag in turbocharged engines. A reduced response time of the driveline 5 is therefore more acceptable in such circumstances.

In the embodiment shown, if the driver selects a gear requiring the driveline 5 to assume the four wheel drive mode of operation the controller 40 is again arranged to control the driveline 5 to assume the four wheel drive mode at a relatively slow rate.

The controller 40 controls the driveline 5 to assume the four wheel drive mode at a relatively high rate (over a first period of time, for example a period which may be around 1 s or less, or any other suitable value greater than 1 s) if the reason for the transition to the four wheel drive mode is one selected from amongst a first list of conditions:

(a) an instantaneous amount of torque being delivered through the driveline to one or more wheels is above a first prescribed instantaneous torque threshold,
(b) a steering wheel angle is above a first prescribed steering angle threshold,
(c) a steerable road wheel angle is greater than a first prescribed steerable road wheel angle threshold,
(d) a rate of change of steerable road wheel angle exceeds a first steerable road wheel angle rate threshold,
(e) a rate of change of steering wheel angle exceeds a first prescribed steering wheel angle rate threshold,
(f) a lateral acceleration of the vehicle is greater than a first prescribed lateral acceleration threshold,
(g) a rate of change of lateral acceleration exceeds a first prescribed lateral acceleration rate threshold,
(h) a throttle or accelerator pedal position value is greater than a first prescribed throttle or accelerator pedal position threshold,
(i) a rate of change of throttle or accelerator pedal position is greater than a first prescribed throttle or accelerator rate threshold,
(j) a driver demanded torque is greater than a first prescribed driver demanded torque threshold,
(k) an engine torque is greater than a first prescribed engine torque threshold,
(l) an amount of wheel slip is above a first prescribed wheel slip threshold,
(m) a vehicle acceleration is greater than a first prescribed vehicle acceleration threshold,
(n) a vehicle deceleration is greater than a first prescribed vehicle deceleration threshold,
(o) a yaw rate of the vehicle is greater than a first prescribed yaw rate threshold,
(p) a yaw rate error is greater than a first prescribed yaw rate error threshold,
(q) a brake pedal position value is greater than a first prescribed brake pedal position threshold, and
(r) a brake pressure value is greater than a first prescribed brake pressure threshold.

It is to be understood that other conditions are also useful. It is to be further understood that some embodiments are arranged such that not all of the above conditions trigger the controller 40 to control the driveline 5 to assume the four wheel drive mode.

The controller 40 controls the driveline 5 to assume the four wheel drive mode at a slower rate (over a second period time which is greater than the first period of time, for example over a period of 2 s) if the reason for the transition to the four wheel drive mode is one selected from amongst a second list of conditions:

(a) a manual or automatic gear shift control is set to one of a first set of one of one or more prescribed gear shift position values,
(b) an operating temperature is below a first prescribed operating temperature threshold,
(c) an ambient temperature is below first a prescribed ambient temperature threshold,
(d) a temperature of a vehicle component is below a first component temperature threshold,
(e) a temperature of a vehicle fluid is below a first fluid temperature threshold,
(f) a temperature of a component of the auxiliary driveline is below a first prescribed driveline component lower temperature threshold,
(g) a temperature of a fluid of the auxiliary driveline is below a first prescribed driveline fluid lower temperature threshold,
(h) a temperature of a component of the auxiliary driveline is above a first prescribed driveline component upper temperature threshold greater than the first prescribed driveline component lower temperature threshold,
(i) a temperature of a fluid of the auxiliary driveline is above a first prescribed driveline fluid upper temperature threshold greater than the first prescribed driveline fluid lower temperature threshold,
(j) a speed of the vehicle is below a first prescribed vehicle speed threshold,
(k) the vehicle has begun to operate according to one or more of a prescribed set of one or more vehicle operating programs,
(l) a roughness of a driving surface exceeds a first prescribed surface roughness threshold, and
(m) a current or target gear of an automatic transmission is set to one of a first set of one of one or more gear values Thus, a rate at which the controller 40 controls the vehicle to assume the four wheel drive mode is greater if a condition of the first list is met than if the vehicle assumes the four wheel drive mode because a condition of the second list is met. In other words, the amount of time for a transition from the first mode to the second mode to be completed once the transition has been commenced is lower if a condition of the first list is met and greater if a condition of the second list and not the first list is met. This is because in some situations a risk of loss of traction may be greater if a condition of the first list is met compared with a condition of the second list.

It is to be understood that other conditions are also useful. It is to be further understood that some embodiments are arranged such that not all of the above conditions trigger the driveline state control portion 204 to control the driveline 5 to assume the four wheel drive mode.

Other arrangements are also useful.

Furthermore, in the case of the first list the controller 40 is arranged to increase the rate at which the connection operation is performed (i.e. reduce the amount of time taken for the connection operation to be performed) in response to an amount by which the respective vehicle operating parameter triggering the connection operation exceeds the prescribed value. The response of the controller 40 to a condition requiring four wheel drive mode to be assumed is therefore dependent on a severity of a situation in which the vehicle is found.

In some embodiments the speed at which a connection operation is performed is dependent on a volume setting of an audio system of the vehicle such as an in-vehicle entertainment system.

Higher levels of sound produced by the audio system are able to mask increased levels of noise from the driveline 10 and therefore a decrease in NVH performance of the driveline 10 will be less perceptible at higher audio system sound levels.

The vehicle 1 is provided with an antilock braking system (ABS) arranged to control a brake of one or more wheels of the vehicle to reduce an amount of braking action when required in order to prevent skidding. The vehicle 1 also has a dynamic stability control system (DSC) 60 arranged to control an amount of torque delivered to one or more wheels of the vehicle to prevent wheel slip.

Furthermore, the vehicle 1 may have a traction control system (TCS) 70 arranged to monitor wheels of the vehicle 1 and to apply a brake to a wheel in the event that it is determined that the wheel is rotating at a speed that is higher than that required for substantially no wheel slip to occur.

It is to be understood that the controller 40 of the vehicle 1 is configured to implement a pair of evaluators for determining when a transition from the two wheel drive mode to the four wheel drive mode should be performed.

Figure 2:
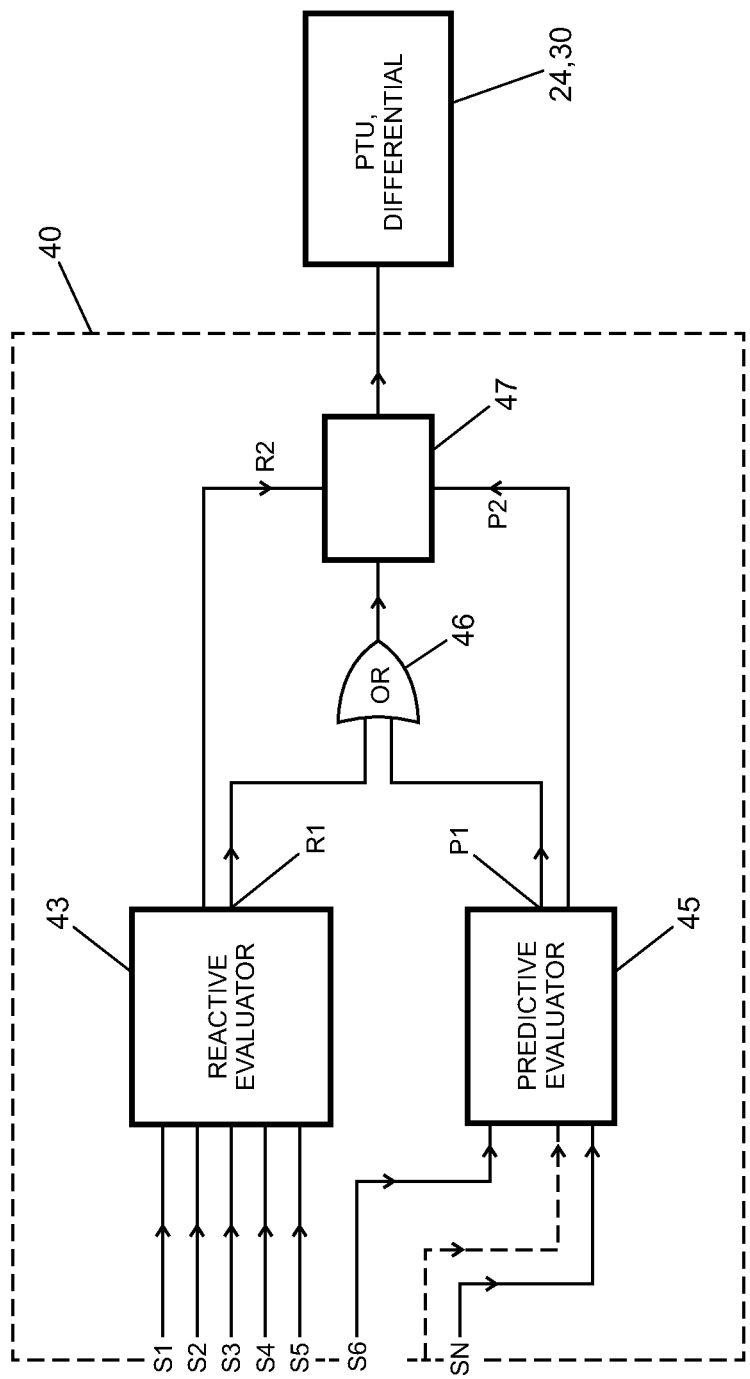
FIG. 2 is a schematic illustration of a portion of a vehicle controller according to an embodiment of the invention.

FIG. 2 is a schematic illustration of a portion of the controller 40. The controller 40 has a reactive evaluator 43 embodied in computer software code that is run by a computing device of the controller 40. The reactive evaluator 43 is arranged to evaluate signals S1, S2, S3, S4, S5 received by the controller 40. The signals are responsive to:
(a) an amount of longitudinal wheel slip of one or more wheels,
(b) a yaw rate error,
(c) a determination whether an antilock braking system (ABS) 50 is active;
(d) a determination whether a dynamic stability control system (DSC) 60 is active; and
(e) a determination whether a traction control system (TCS) 70 is active.

When the vehicle 1 is in the two wheel drive mode of operation and one or more values of the signals S1, S2, S3, S4, S5 meet a set of one or more prescribed reactive evaluator conditions, the reactive evaluator 43 is arranged to trigger a transition from the two wheel drive mode to the four wheel drive mode.

In order to trigger the transition from the two wheel drive mode to the four wheel drive mode the reactive evaluator 43 provides an output signal R1 to a control module 47 that controls the state of the driveline 5, i.e. whether the driveline 5 is in the two wheel drive mode or the four wheel drive mode.

In the embodiment of FIG. 2 the output signal R1 is provided to the control module 47 via a logical OR gate 46.

The reactive evaluator 43 is arranged to determine when conditions actually exist that require the four wheel drive mode to be assumed immediately.

In the present embodiment, when the reactive evaluator 43 determines that the amount of longitudinal wheel slip exceeds a prescribed threshold, or the amount of yaw rate error (indicting lateral wheel slip) exceeds a prescribed threshold the vehicle is arranged to assume the four wheel drive mode immediately and at a relatively rapid rate.

Similarly, if the reactive evaluator 43 determines that any one of ABS system 50, DSC system 60 and TCS system 70 is active the reactive evaluator 43 controls the vehicle to assume the four wheel drive mode at a relatively rapid rate. In some embodiments the reactive evaluator 43 is arranged to determine a severity of the response of the ABS system 50, DSC system 60 and/or TCS system 70 before deciding whether to trigger a transition to the second mode.

The reactive evaluator 43 provides a control signal R2 to a control module 47 configured to control the vehicle to transition between the two wheel drive and four wheel drive modes. The control signal R2 is responsive to the rate at which the transition from the two wheel drive mode to the four wheel drive mode should be made. Thus the control module 47 is able to determine when and at what rate a transition to the four wheel drive mode is required.

The controller 40 also has a predictive evaluator 45 embodied in computer software code that is run by a computing device of the controller 40. In the embodiment shown in FIG. 2 the computing device is the same computing device as the device running the software embodying the reactive evaluator 43. Alternatively the computing device may be a different computing device.

Like the reactive evaluator 43, the predictive evaluator 45 is also arranged to evaluate signals (signals S6, . . . , SN) received by the controller 40 corresponding to the values of different respective vehicle operating parameters.

However, rather than determining when conditions actually exist for which four wheel drive operation is required as in the case of the reactive evaluator 43, the predictive evaluator 45 is arranged to determine when conditions exist that indicate that a transition from the two wheel drive mode to the four wheel drive mode is likely to be required within a prescribed period of time based on the values of one or more operating parameters, which may be:
(a) an instantaneous amount of torque being delivered through the driveline to one or more wheels,
(b) a steering wheel angle,
(c) a steerable road wheel angle,
(d) a rate of change of steerable road wheel angle,
(e) a rate of change of steering wheel,
(f) a lateral acceleration of the vehicle,
(g) a rate of change of lateral acceleration,
(h) a throttle or accelerator pedal position,
(i) a rate of change of throttle or accelerator pedal position,
(j) a driver demanded torque,
(k) a prime mover torque,
(l) an amount of wheel slip, (m) a vehicle acceleration,
(n) a vehicle deceleration,
(o) a yaw rate,
(p) a yaw rate error,
(q) a gear shift position value of a manual or automatic gear shift control,
(r) an operating temperature,
(s) an ambient temperature,
(t) a temperature of a vehicle component,
(u) a temperature of a vehicle fluid,
(v) a temperature of a component of the auxiliary driveline,
(w) a temperature of a fluid of the auxiliary driveline,
(x) a speed of the vehicle,
(y) the identity of a vehicle operating program being executed by the vehicle,
(z) a roughness of a driving surface over which the vehicle is moving,
(a1) a current or target gear of an automatic transmission,
(b1) a brake pedal position value is greater than a first prescribed brake pedal position threshold, and
(c1) a brake pressure value is greater than a first prescribed brake pressure threshold.

The predictive evaluator 45 may also have as an input one or more of the signals fed to the reactive evaluator.

It is to be understood that in some embodiments the predictive evaluator 45 may be arranged to determine one or more of the above operating parameters (such as yaw rate error) based on the value of one or more other operating parameters rather than receiving an input signal specifically representing the value of that parameter.

When the predictive evaluator 45 determines that a transition from the first mode to the second mode is likely to be required the predictive evaluator 43 is arranged to provide an output signal P1 to trigger a transition from the two wheel drive mode to the four wheel drive mode.

As shown in FIG. 2, the output signal P1 of the predictive evaluator 45 is combined with the output signal R1 of the reactive evaluator 43 in the logical OR operation performed by the logical OR operator 46. The output of the logical OR operator is fed to control module 47 which controls the vehicle to transition to the second mode as described above.

Thus the vehicle 1 may arranged (by means of the predictive evaluator 45) to assume the four wheel drive mode in advance of conditions actually occurring that would cause the reactive evaluator 43 to trigger a transition to the four wheel drive mode.

In some embodiments the predictive evaluator 45 is arranged to determine a probability that a transition to the four wheel drive mode will be required and to generate an output responsive to the probability so determined.

It can be seen in FIG. 2 that the predictive evaluator also provides an output signal P2 to the control module 47. The output signal P2 is recognised by the control module 47 as indicating that the transition from the two wheel drive mode to the four wheel drive mode has been triggered by the predictive evaluator 45. The control module 47 may therefore control the vehicle to transition to the four wheel drive mode at a corresponding rate. This rate may be lower than the rate required by the reactive evaluator 43.

In some embodiments control line P2 may also provide an indication as to the rate at which the transition to the four wheel drive mode should be made.

In some embodiments the control module 47 also checks control signal line R2 to see if the reactive evaluator 43 has also triggered the vehicle 1 to assume the four wheel drive mode. If the value of R2 indicates that a higher rate of connection is required than that which would otherwise be employed by the control module 47 responsive to P2, the control module 47 controls the vehicle 1 to assume the four wheel drive mode at the higher rate required by control signal R2.

Thus if the reactive and predictive evaluators both trigger a transition to the four wheel drive mode substantially simultaneously and prescribe different respective rates, the control module 47 is arranged to trigger the transition to the four wheel drive mode at the higher of the two rates.

In some embodiments the vehicle is configured such that if whilst a transition to the second mode is occurring at one rate, a control input is received requesting a transition at a higher rate, the vehicle continues the transition at the higher of the two rates.

Examples of conditions that may cause the predictive evaluator 45 to trigger a transition from the two wheel drive mode to the four wheel drive mode include (a) the condition that the amount of torque applied to a stationary wheel of the vehicle exceeds a prescribed value (suggesting the vehicle may be seeking to launch whilst on a hill with a heavy load and therefore an increased risk of skidding exists) and (b) that the speed of the vehicle exceeds a prescribed value for a given steerable road wheel angle (suggesting the vehicle is cornering at speed with an increased risk of skidding).

It is to be understood that the reactive evaluator 43 may not trigger a transition to the four wheel drive mode under condition (a) since the wheel is not actually slipping. It is to be further understood that the fact that the predictive evaluator 45 determines that a risk of wheel slip exists and triggers the transition to the four wheel drive mode of operation before wheel slip actually takes place reduces a risk that the vehicle 1 will subsequently experience wheel slip (longitudinal or lateral).

It is to be understood that the reactive evaluator 43 may not trigger a transition to the four wheel drive mode under condition (b) above if the vehicle 1 is not actually skidding as it negotiates a corner. Again, the fact that the predictive evaluator 45 determines that a risk of skidding exists and triggers the transition to the four wheel drive mode of operation before a skid actually takes place reduces a risk that the vehicle 1 will experience wheel slip (longitudinal or lateral) as it negotiates the corner.

It is to be understood that the reactive evaluator 43 is required to process a substantial amount of information continually in order to determine whether or not conditions requiring an immediate transition from the two wheel drive mode to the four wheel drive mode exist.

By providing a predictive evaluator 45 in addition to the reactive evaluator 43, the reactive evaluator 43 may continue rapidly to process vehicle operating condition information in respect of whether an immediate transition from the two wheel drive mode to the four wheel drive mode is required whilst the predictive evaluator 45 performs potentially more sophisticated calculations in respect of the values of vehicle operating parameters in order to determine whether conditions are likely to exist in the future that will require a transition to the four wheel drive mode.

It is to be understood that wheel slip is undesirable at least in part because excessive wear of tyres or one or more other components of the driveline 5 may occur as well as damage to the driving surface. A vehicle may become immobilised on a driving surface following a wheel spin event in which the surface is modified sufficiently to prevent traction.

It is to be understood that the predictive evaluator 45 may perform more sophisticated calculations taking a longer period of time to complete than those of the reactive evaluator 43 without compromising a response time of the vehicle 1 in assuming the four wheel drive mode responsive to the existence of wheel slip because the reactive evaluator 43 continues to function in parallel with the predictive evaluator 45.

In some embodiments the predictive evaluator 45 is arranged to determine whether a transition to the four wheel drive mode may be required responsive to a history of a driving style of a driver of the vehicle 1. Thus if the predictive evaluator 45 determines that wheel-spin is occurring frequently when the vehicle 1 first launches from a stationary condition, the predictive evaluator 45 may be arranged to control the vehicle automatically to assume the four wheel drive mode of operation when the vehicle is stationary. The predictive evaluator 45 may be arranged to consider the history of the driving style of the user over a prescribed historical time period or a prescribed number of previous drivecycles. Other arrangements are also useful.

Similarly, the predictive evaluator 45 may determine that an amount of lateral acceleration of the vehicle 1 is fluctuating repeatedly between relatively high values and relatively low values. Such fluctuations may suggest for example that the vehicle 1 is negotiating a winding road. The predictive evaluator 45 may therefore control the vehicle 1 to assume the four wheel drive mode on the basis that an increased probability exists that the reactive evaluator 43 will trigger a transition to the four wheel drive mode of operation.

The historical time period may be a period of the order of a few seconds, a few minutes, a few tens of minutes, a few hours, a few days, a few weeks or any other suitable period of time. The length of the historical time period employed may also be responsive to the particular operating parameter(s) under consideration.

In some embodiments, the reactive evaluator 43 is arranged only to output a signal requesting a transition to the second mode at a relatively high rate when it determines that a transition to the second mode is required. In contrast, the predictive evaluator 45 may be arranged to output a signal requesting a transition to the second mode at either a relatively high rate or a relatively low rate when the predictive evaluator 45 determines that a transition to the second mode is required.

The relatively high rate instructed by the reactive evaluator 43 may be substantially the same as the relatively high rate instructed by the predictive evaluator 45. Alternatively it may be higher or lower.

In some embodiments the predictive evaluator 45 is arranged to output a signal requesting a relatively fast transition if the predictive evaluator 43 determines that the transition to the second mode should be made and prescribed conditions are met in respect of one or more of the accelerator pedal position, the engine speed and the currently selected gear.

If the prescribed conditions are not met, the predictive evaluator 45 is arranged to output a signal requesting a relatively slow transition if the predictive evaluator 45 determines that the transition to the second mode should be made.

In some arrangements, if the accelerator pedal position exceeds a prescribed position when the vehicle 1 is in a prescribed gear and the engine speed is above a prescribed speed the predictive evaluator 45 is arranged to request a transition at a relative high rate. For example, if the engine speed exceeds 3000 revolutions per minute (rpm) or any other suitable number.

The critical throttle position may vary with selected gear. For example the critical position may be 70% depression when in first gear, 80% depression when in second gear and 95% depression when in third gear. Other depression values are also useful.

Other arrangements are also useful in respect of triggering by the reactive evaluator 43 or the predictive evaluator 45 a transition from the first mode to the second mode.

It is to be understood that reference to a 'relatively high' (or 'HIGH) rate is to be understood to be reference to a rate that is higher than a 'relatively low' (or 'LOW') rate, and reference to a 'relatively low' (LOW) rate is to be understood to be reference to a rate that is lower than a 'relatively high' (HIGH) rate.

Figure 3:
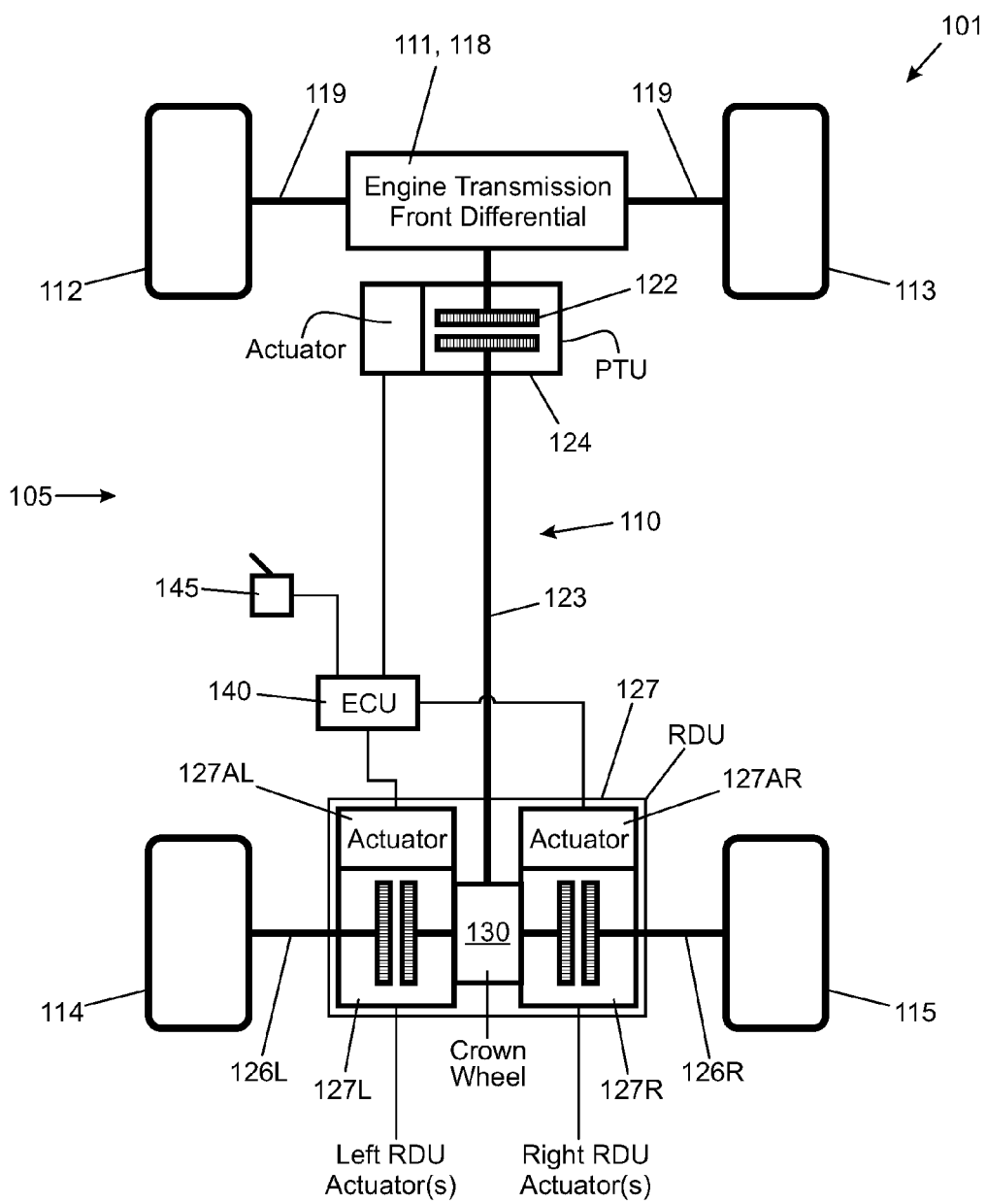
FIG. 3 is a schematic illustration of a vehicle according to a further embodiment of the present invention.

FIG. 3 shows a driveline 105 of a vehicle 101 according to a further embodiment of the invention. Like features of the embodiment of FIG. 3 to those of FIG. 1 are provided with like reference signs prefixed numeral 1.

The embodiment of FIG. 3 is similar to that of FIG. 1 in that driveline 105 has a power transfer unit (PTU) 124 (sometimes referred to as a power take off unit) having a power transfer clutch (PTC) 122 operable to connect one end of an auxiliary drive shaft or prop shaft 123 of an auxiliary portion 110 of the driveline 105 to the engine 111 via the transmission 118.

However, instead of a rear differential 30 as in the embodiment of FIG. 1 the auxiliary portion 110 has a rear drive unit (RDU) 127. In the embodiment of FIG. 3 the RDU 127 has a crown wheel 130 coupled to an end of the prop shaft 123 opposite the end of the prop shaft 123 that is connected to the PTU 124.

The RDU 127 also has a pair of friction clutches 127L, 127R operable to couple the crown wheel 130 to left and right rear drive shafts 126L, 126R, respectively.

The RDU 127 is provided with left and right actuators 127AL, 127AR respectively operable to open and close the left and right friction clutches 127L, 127R respectively. The actuators 127AL, 127AR are arranged such that as the actuators 127AL, 127AR move from a first position in which both friction clutches 127L, 127R are open towards a second position in which both friction clutches 127L, 127R are closed, pressure is applied to the respective friction clutches 127L, 127R thereby to close the friction clutches 127L, 127R.

It is to be understood that the controller 140 is operable to control the rate at which the PTU 124 closes the PTC 122 and the rate at which the actuators 127AL, 127AR move between the first and second positions thereby to control the rate at which the vehicle transitions between the two wheel drive and four wheel drive modes in a similar manner to the embodiment of FIG. 1 described above.

It is to be understood that arrangements of a driveline 5, 105 other than those shown in FIG. 1 and FIG. 3 are also useful.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from UK patent application no. GB1102823.0 filed 18 Feb. 2011, the entire contents of which are expressly incorporated by reference herein.

The invention claimed is:

1. A motor vehicle having:
   a prime mover;
   at least first and second groups of one or more wheels; and
   a driveline operable by means of a controller to connect a torque transmission path from the prime mover to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
   the driveline being operable to connect the second group to the torque transmission path from the prime mover by means of an auxiliary portion thereof, the auxiliary portion comprising first and second releasable torque transmitting means and a prop shaft, the first releasable torque transmitting means being operable to connect a first end of the prop shaft to the torque transmission path from the prime mover, the second releasable torque transmitting means being operable to connect a second end of the prop shaft to the second group of one or more wheels,
   the controller being operable to control auxiliary portion to switch the driveline between the first and second modes of operation such that in the first mode the prop shaft is disconnected from both the torque transmission path from the prime mover and the second group of one or more wheels,
   the controller being operable to control the auxiliary portion to connect the second group of one or more wheels to the torque transmission path from the prime mover at a required connect rate when the driveline transitions between the first mode and the second mode,
   wherein when the driveline is in the first mode the controller is operable to control the driveline to transition to the second mode when one of a set of two or more trigger conditions in respect of one or more vehicle operating parameters is met, each trigger condition having a respective identity, the controller being operable to control the driveline to transition from the first mode to the second mode at a connect rate that is responsive to an identity of the trigger condition that is met.

2. The motor vehicle as claimed in claim 1 wherein the set of two or more trigger conditions includes at least one condition selected from amongst the conditions that:
   (a) an instantaneous amount of torque being delivered through the driveline to one or more wheels is above a first prescribed instantaneous torque threshold,
   (b) a steering wheel angle is above a first prescribed steering angle threshold,
   (c) a steerable road wheel angle is greater than a first prescribed steerable road wheel angle threshold,
   (d) a rate of change of steerable road wheel angle exceeds a first steerable road wheel angle rate threshold,
   (e) a rate of change of steering wheel angle exceeds a first prescribed steering wheel angle rate threshold,
   (f) a lateral acceleration of the motor vehicle is greater than a first prescribed lateral acceleration threshold,
   (g) a rate of change of lateral acceleration exceeds a first prescribed lateral acceleration rate threshold,
   (h) a throttle or accelerator pedal position value is greater than a first prescribed throttle or accelerator pedal position threshold,
   (i) a rate of change of throttle or accelerator pedal position is greater than a first prescribed throttle or accelerator rate threshold,
   (j) a driver demanded torque is greater than a first prescribed driver demanded torque threshold,
   (k) a prime mover torque is greater than a first prescribed prime mover torque threshold,
   (l) an amount of wheel slip is above a first prescribed wheel slip threshold,
   (m) a vehicle acceleration is greater than a first prescribed vehicle acceleration threshold,
   (n) a vehicle deceleration is greater than a first prescribed vehicle deceleration threshold,
   (o) a yaw rate of the motor vehicle is greater than a first prescribed yaw rate threshold,
   (p) a yaw rate error is greater than a first prescribed yaw rate error threshold,
   (q) a manual or automatic gear shift control is set to one of a first set of one of one or more prescribed gear shift position values,
   (r) an operating temperature is below a first prescribed operating temperature threshold,
   (s) an ambient temperature is below first a prescribed ambient temperature threshold,
   (t) a temperature of a vehicle component is below a first component temperature threshold,
   (u) a temperature of a vehicle fluid is below a first fluid temperature threshold,
   (v) a temperature of a component of the auxiliary portion is below a first prescribed driveline component lower temperature threshold,
   (w) a temperature of a fluid of the auxiliary portion is below a first prescribed driveline fluid lower temperature threshold,
   (x) a temperature of a component of the auxiliary portion is above a first prescribed driveline component upper temperature threshold greater than the first prescribed driveline component lower temperature threshold,
   (y) a temperature of a fluid of the auxiliary portion is above a first prescribed driveline fluid upper temperature threshold greater than the first prescribed driveline fluid lower temperature threshold,
   (z) a speed of the motor vehicle is below a first prescribed vehicle speed threshold,
   (a1) the motor vehicle has begun to operate according to one or more of a prescribed set of one or more vehicle operating programs,
   (b1) a roughness of a driving surface exceeds a first prescribed surface roughness threshold,
   (c1) a current or target gear of an automatic transmission is set to one of a first set of one of one or more gear values,
   (d1) a brake pedal position value is greater than a first prescribed brake pedal position threshold, and
   (e1) a brake pressure value is greater than a first prescribed brake pressure threshold.

3. The motor vehicle as claimed in claim 1 having a plurality of driver-selectable vehicle programs of operation wherein the set of two or more trigger conditions includes a requirement that the motor vehicle is operating according to a prescribed vehicle program.

4. The motor vehicle as claimed in claim 1 wherein the connect rate is responsive to a speed of the motor vehicle and the connect rate is arranged to increase as a function of increasing vehicle speed.

5. The motor vehicle as claimed in claim 1 wherein the prime mover is arranged to rotate in use, the connect rate being responsive to a speed of rotation of the prime mover, the connect rate being arranged to increase as a function of increasing prime mover rotation speed.

6. The motor vehicle as claimed in claim 1 wherein the connect rate is responsive to an amount of lateral acceleration of the motor vehicle.

7. The motor vehicle as claimed in claim 6 wherein the connect rate is arranged to increase as a function of increasing lateral acceleration of the motor vehicle.

8. The motor vehicle as claimed in claim 7 wherein when the amount of lateral acceleration exceeds a threshold value the controller is arranged to control the driveline to connect the second group of one or more wheels to the prime mover at a connect rate that is greater than that when the amount of lateral acceleration does not exceed the threshold value.

9. The motor vehicle as claimed in claim 1 wherein the connect rate is responsive to a volume of a vehicle audio system.

10. The motor vehicle as claimed in claim 9 wherein the connect rate is arranged to increase as a function of increasing volume of an audio system.

11. The motor vehicle as claimed in claim 9 wherein the volume is a user-selected volume.

12. The motor vehicle as claimed in claim 9 wherein the volume is an actual volume of sound emanating from the audio system at a moment a connect event is required.

13. The motor vehicle as claimed in claim 1 wherein the set of two or more trigger conditions comprises at least a first subset of one or more conditions and a second subset of one or more conditions, the driveline being arranged to assume the second mode at a connect rate that is greater when a condition of the first subset is met than that when a condition of the second subset is met and no condition of the first subset is met.

14. The motor vehicle as claimed in claim 13 wherein the first subset of conditions comprises at least one selected from amongst the conditions that:
  (a) an instantaneous amount of torque being delivered through the driveline to one or more wheels is above a first prescribed instantaneous torque threshold,
  (b) a steering wheel angle is above a first prescribed steering angle threshold,
  (c) a steerable road wheel angle is greater than a first prescribed steerable road wheel angle threshold,
  (d) a rate of change of steerable road wheel angle exceeds a first steerable road wheel angle rate threshold,
  (e) a rate of change of steering wheel angle exceeds a first prescribed steering wheel angle rate threshold,
  (f) a lateral acceleration of the motor vehicle is greater than a first prescribed lateral acceleration threshold,
  (g) a rate of change of lateral acceleration exceeds a first prescribed lateral acceleration rate threshold,
  (h) a throttle or accelerator pedal position value is greater than a first prescribed throttle or accelerator pedal position threshold,
  (i) a rate of change of throttle or accelerator pedal position is greater than a first prescribed throttle or accelerator rate threshold,
  (j) a driver demanded torque is greater than a first prescribed driver demanded torque threshold,
  (k) a prime mover torque is greater than a first prescribed prime mover torque threshold,
  (l) an amount of wheel slip is above a first prescribed wheel slip threshold,
  (m) a vehicle acceleration is greater than a first prescribed vehicle acceleration threshold,
  (n) a vehicle deceleration is greater than a first prescribed vehicle deceleration threshold,
  (o) a yaw rate of the motor vehicle is greater than a first prescribed yaw rate threshold,
  (p) a yaw rate error is greater than a first prescribed yaw rate error threshold,
  (q) a brake pedal position value is greater than a first prescribed brake pedal position threshold, and
  (r) a brake pedal pressure value is greater than a first prescribed brake pedal position threshold.

15. The motor vehicle as claimed in claim 13 wherein the second subset of conditions comprises at least one condition selected from amongst the conditions that:
  (a) a manual or automatic gear shift control is set to one of a first set of one of one or more prescribed gear shift position values,
  (b) an operating temperature is below a first prescribed operating temperature threshold,
  (c) an ambient temperature is below first a prescribed ambient temperature threshold,
  (d) a temperature of a vehicle component is below a first component temperature threshold,
  (e) a temperature of a vehicle fluid is below a first fluid temperature threshold,
  (f) a temperature of a component of the auxiliary portion is below a first prescribed driveline component lower temperature threshold,
  (g) a temperature of a fluid of the auxiliary portion is below a first prescribed driveline fluid lower temperature threshold,
  (h) a temperature of a component of the auxiliary portion is above a first prescribed driveline component upper temperature threshold greater than the first prescribed driveline component lower temperature threshold,
  (i) a temperature of a fluid of the auxiliary portion is above a first prescribed driveline fluid upper temperature threshold greater than the first prescribed driveline fluid lower temperature threshold,
  (j) a speed of the motor vehicle is below a first prescribed vehicle speed threshold,
  (k) the motor vehicle has begun to operate according to one or more of a prescribed set of one or more vehicle operating programs,
  (l) a roughness of a driving surface exceeds a first prescribed surface roughness threshold and
  (m) a current or target gear of an automatic transmission is set to one of a first set of one of one or more gear values.

16. The motor vehicle as claimed in claim 13 wherein the driveline is configured to assume the second mode responsive to an output of a reactive evaluator and an output of a predictive evaluator,
  the output of the reactive evaluator being responsive to a determination whether an amount of wheel slip has exceeded a first prescribed threshold,
  the output of the predictive evaluator being responsive to a determination that one or more conditions in respect of one or more vehicle operating parameters are met indicating that the amount of wheel slip may be about to exceed a second prescribed threshold when an amount of wheel slip is below the first prescribed threshold.

17. The motor vehicle as claimed in claim 16 wherein the second subset of conditions comprises the condition that the output of the predictive evaluator indicates that the second mode of operation should be assumed.

18. The motor vehicle as claimed in claim 16 wherein the first subset of conditions includes the condition that the output of the reactive evaluator indicates that the second mode of operation should be assumed.

19. The motor vehicle as claimed in claim 16 wherein the predictive evaluator is arranged to determine a likelihood of one of the first set of conditions occurring within a prescribed period of time based on a value of one or more vehicle operating parameters.

20. The motor vehicle as claimed in claim 1 wherein the connect rate is responsive to a history of previous connect rates, the controller being arranged to store data associated with previous connect events responsive to which the controller is operable to determine a required connect rate when a transition from the first mode to the second mode is required.

21. The motor vehicle as claimed in claim 20 wherein the data corresponds to at least one selected from amongst the rate of connection assumed during one or more previous connect events, the identity of the trigger condition triggering one or more previous connect events and a value of one or more vehicle operating parameters when one or more previous connect events occurred.

22. The motor vehicle as claimed in claim 1 wherein the controller is configured to control the driveline to assume the second mode at a rate responsive to a coefficient of friction of a surface on which the motor vehicle is driving.

23. The motor vehicle as claimed in claim 22 wherein the driveline is configured to assume the second mode at a rate responsive to a predicted coefficient of friction of a surface on which the motor vehicle is driving.

24. The motor vehicle as claimed in claim 1 wherein the driveline is configured to assume the first mode from the second mode at a substantially constant rate irrespective of the identity of the trigger condition triggering the transition to the second mode.

25. The motor vehicle as claimed in claim 13 wherein the controller is configured to control the driveline to transition from the second mode to the first mode at a rate that is less than the rate at which a transition from the first mode to the second mode is made when a condition of the first subset is met.

26. The motor vehicle as claimed in claim 1 wherein when in the first mode the driveline is operable to transition to the second mode when the value of one or more vehicle operating parameters is greater than or less than a prescribed value, the driveline being arranged to transition to the second mode at a rate responsive to the difference between the prescribed value and the value of the motor vehicle operating parameter when the transition to the second mode is made.

27. The motor vehicle as claimed in claim 1 wherein one or both of the first and second releasable torque transmitting means comprises one or more actuators arranged to perform a connection operation at a connection operation rate, the connection operation rate being dependent on a rate of movement of the one or more actuators.

28. The motor vehicle as claimed in claim 1 wherein one or both of the first and second releasable torque transmitting means comprises a plurality of actuators arranged to perform a connection operation at a connection operation rate.

29. The motor vehicle as claimed in claim 28 wherein at least two of the actuators of the one or both of the first and second releasable torque transmitting means are arranged to be actuated at different respective moments in time, the connection operation rate being dependent on an amount of time elapsing between actuation of the respective actuators.

30. The motor vehicle as claimed in claim 28 wherein the first releasable torque transmitting means comprises at least a first actuator and the second releasable torque transmitting means comprises at least a first actuator, the connection rate being dependent on an amount of time elapsing between actuation of respective actuators of the first and second releasable torque transmitting means.

31. The motor vehicle as claimed in claim 1 wherein the prime mover comprises at least one selected from amongst an engine and an electric machine.

32. A method of controlling a motor vehicle, the motor vehicle having:
a prime mover;
at least first and second groups of one or more wheels; and
a driveline operable by means of a controller to connect a torque transmission path from the prime mover to the first and second groups of one or more wheels such that the first group of one or more wheels and not the second group is coupled to the torque transmission path when the driveline is in a first mode of operation and both the first and second groups of one or more wheels are coupled to the torque transmission path when the driveline is in a second mode of operation,
the driveline being operable to connect the second group to the torque transmission path from the prime mover by means of an auxiliary portion thereof, the auxiliary portion comprising first and second releasable torque transmitting means and a prop shaft, the first releasable torque transmitting means being operable to connect a first end of the prop shaft to the torque transmission path from the prime mover, the second releasable torque transmitting means being operable to connect a second end of the prop shaft to the second group of one or more wheels,
the method comprising:
controlling the auxiliary portion to switch the driveline between the first and second modes of operation whereby in the first mode the prop shaft is disconnected from both the torque transmission path from the prime mover and the second group of one or more wheels;
controlling the driveline to transition to the second mode when one of a set of two or more trigger conditions in respect of one or more vehicle operating parameters is met, each trigger condition having a respective identity; and
controlling the driveline to transition from the first mode to the second mode at a connect rate that is responsive to an identity of the trigger condition that is met.

33. A system for a vehicle having a driveline comprising a prime mover, at least a pair of rear wheels, a shaft for connecting the prime mover to the pair of rear wheels, first releasable torque transmitting means for selectively connecting a prop shaft to the prime mover and a second releasable torque transmitting means for selectively connecting the prop shaft to the pair of rear wheels, the system comprising a controller configured to control operation of the first and second torque transmitting coupling means in one of a first mode of operation, in which the prop shaft is disconnected from both the prime mover and the pair of rear wheels, and a second mode of operation, in which the prime mover is connected to the rear wheels by the prop shaft, the controller being arranged to cause a transition from the first mode of operation to the second mode of operation in response to a trigger condition selected from a group one of at least two trigger conditions being met, each trigger condition in the group of at least two trigger conditions relating to a respective vehicle operating parameter and having an respective identity, wherein the transition from the first mode to the second mode is made at a connect rate that is dependent on an identity of the trigger condition being met.

34. The system as claimed in claim 33, wherein the controller is arranged to cause transition from the first mode of operation to the second mode of operation at a connect rate that is different when in response to a first trigger condition being met than when in response to a second trigger condition being met.

* * * * *